(12) United States Patent
Gunnarsson

(10) Patent No.: US 8,110,166 B2
(45) Date of Patent: Feb. 7, 2012

(54) PROCESS FOR PRODUCING SILICA FROM OLIVINE

(75) Inventor: Gudmundur Gunnarsson, Reykjavik (IS)

(73) Assignee: SilMag DA, Porsgrunn (NO)

( * ) Notice: Subject to any disclaimer, the term of this patent is extended or adjusted under 35 U.S.C. 154(b) by 326 days.

(21) Appl. No.: 10/536,194

(22) PCT Filed: Nov. 27, 2003

(86) PCT No.: PCT/IS03/00035
§ 371 (c)(1),
(2), (4) Date: May 24, 2005

(87) PCT Pub. No.: WO2004/048264
PCT Pub. Date: Jun. 10, 2004

(65) Prior Publication Data
US 2006/0051279 A1 Mar. 9, 2006

(30) Foreign Application Priority Data
Nov. 27, 2002 (IS) .............................. 6635

(51) Int. Cl.
*C01B 33/12* (2006.01)
(52) U.S. Cl. ...................... 423/335; 423/340
(58) Field of Classification Search .................. 423/335, 423/340, 339, 265, 266, 274, 275; 252/313.1, 252/313.2, 313.6; 502/439
See application file for complete search history.

(56) References Cited

U.S. PATENT DOCUMENTS

| 2,863,727 A | 12/1958 | Morgan et al. |
| 4,537,699 A | 8/1985 | Jas |
| 5,780,005 A | 7/1998 | Olerud |

FOREIGN PATENT DOCUMENTS

| GB | 883 476 A | 11/1961 |
| GB | 2078703 A | 1/1982 |
| WO | WO 02 48036 A | 6/2002 |

OTHER PUBLICATIONS

International Search Report.
International Preliminary Examination Report.
Nelson, Jr., R.D., "Powders, Handling, Dispersion of Powders in Liquids" in Encyclopedia of Chemical Technology, Supplemental Volume, pp. 339-371 (1996).

*Primary Examiner* — Stanley Silverman
*Assistant Examiner* — Anthony J Zimmer
(74) *Attorney, Agent, or Firm* — Harness, Dickey & Pierce, P.L.C.

(57) ABSTRACT

A process for producing from olivine precipitated silica with controlled specific surface area and high degree of purity. The process comprises adding olivine in a controlled manner to a heated mineral acid solution; after separating undissolved olivine and filtering the silica is slurried in aqueous solution to obtain a low viscosity high solid content silica slurry that can be efficiently degritted and dried with a relatively low energy consumption. The obtained silica can be in powder, bead or granule form and preferably has a specific surface area of at least about 100 $m^2$/g.

30 Claims, 2 Drawing Sheets

PROCESS FOR PRODUCING SILICA FROM OLIVINE

FIELD OF INVENTION

The invention concerns a process for the production of silica, in powder, bead or granule from, from olivine. In particular it concerns a process in which novel methods are used to control the specific surface area of the precipitated silica and to obtain silica of high purity.

TECHNICAL BACKGROUND AND PRIOR ART

Precipitated silica is conventionally produced from sodium silicate solutions and acids, most often sulfuric acid. An alternative raw material for precipitated silica is olivine, a natural magnesium iron silicate available in large quantities at many locations in the world. Olivine is easily soluble in acid and has been considered as a raw material for magnesium chemicals and silica. The raw mined olivine can contain up to 5-8 wt % of accessory minerals (e.g., pyroxene, spinel, and chlorite) that are poorly soluble in acid, and that will contaminate the precipitated silica unless proper measures are taken. Olerud (U.S. Pat. No. 5,780,005) describes a process for production of silica from olivine. Olerud discloses a process including pretreatment of the olivine in order to remove from it most of the accessory minerals that might otherwise contaminate precipitated silica produced from the olivine. The process by Olerud also includes features for controlling the specific surface area of the produced silica. It is demonstrated that acid strength, temperature, and leaching time all have an effect on the specific surface area of the silica.

Another process for the production of active silica from natural silicates has been described by Maslo (UK patent application GB 2 078703 A). The process focuses on the production of silica from serpentine and the content of impurities in the silica obtained is relatively high. WO02/48036 A1 describes a process for the production of silica from olivine. This process is based on the sulfatisation of olivine with concentrated sulfuric acid at approx. 250° C., followed by leaching in water to give precipitated silica, which is then subjected to further purification steps.

Jas (U.S. Pat. No. 4,537,699) discloses a process for providing stable sprayable suspensions of precipitated silica, with a relatively high solids content, and a pH value greater than 3.5-4, by adding an aluminate compound such as sodium aluminate to precipitated silica.

New efficient and economical methods to produce precipitated silica from olivine would be greatly appreciated, in particular methods to produce silica with high surface area and a high degree of purity.

OBJECTS OF THE INVENTION

Olivine is a potentially useful raw material for production of precipitated silica and magnesium metal or magnesium chemicals. The metal chloride solution obtained by dissolution of olivine in hydrochloric acid contains magnesium, iron, nickel and manganese, as well as other components in low content. High purity magnesium chloride can be obtained from this solution by controlled precipitation of iron, nickel, manganese and other impurities. A concentrated magnesium chloride solution for further processing can be obtained by evaporation of the purified magnesium chloride solution. In order to minimize energy use for evaporation it is important that the metal chloride solution obtained by dissolution of olivine is as concentrated as possible. This may conflict with the wish to obtain in the same process silica with high specific surface area since it has been found that the higher the concentration of the acid used the lower the specific surface area of the silica obtained (see Olerud).

It is an object of the present invention to provide high specific surface area silica (preferably higher than 100 $m^2/g$ BET surface area) with a high purity. It is a further object of the invention to obtain a metal chloride solution with high metal content.

The economics and benefits of a potential olivine dissolution process will also depend on the market value of the precipitated silica obtained. The value of the silica depends on the purity of the silica, as well as on other properties. A highly important property of a silica powder is the specific surface area, which can be measured for example with the BET method (See for example international standard ISO 9277: 1995). The desired specific surface area varies for different applications. Methods to control the specific surface area of the silica obtained by dissolution of olivine will therefore be appreciated, preferably it should be possible to produce from one olivine grade, of substantially the same particle size distribution, many different silica grades.

It is therefore a further object of the invention to provide a method for producing from olivine, silica of controlled specific surface area and having a low content of impurities.

The above objects are achieved with a process comprising the steps of providing olivine of suitable particle size, dissolving the olivine in mineral acid under controlled conditions, optionally separating at least a portion of coarse mineral impurities (including undissolved olivine) from the slurry of precipitated silica, filtering and washing the silica to remove dissolved salt, slurrying the silica in water and adjusting the pH to a value in the range of about 1-5 to obtain a low viscosity concentrated slurry. Remaining insoluble materials in the silica can then be separated from the silica by gravitational methods and the pH of the silica slurry may optionally be adjusted before drying the slurry to finally obtain silica powder, beads or granules.

FIGURES

DETAILED DESCRIPTION OF THE INVENTION

Figure 1:
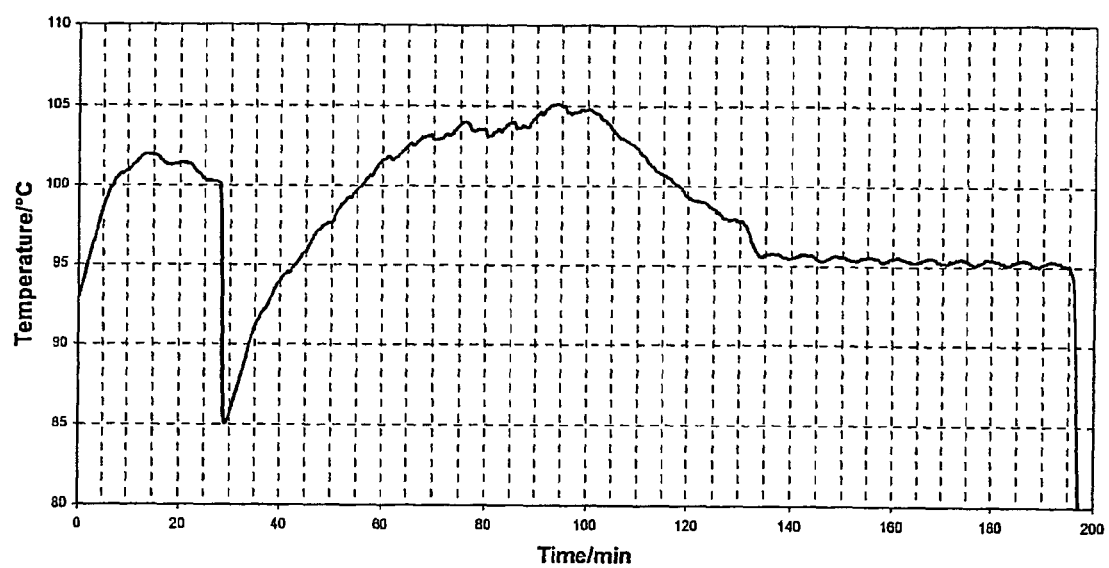
FIG. 1 is a diagram showing the temperature profile hydrochloric acid-olivine slurry during a leaching experiment described in Example 4.

For the process of the present invention the olivine particles should have a suitable particle size, which is preferably less than about 1 mm in diameter, more preferably less than about 0.750 mm in diameter, and even more preferably less than about 0.500 mm in diameter, and preferably in the range of about 0.020-0.500 mm in diameter, and more preferably less than about 0.200 mm. Suitable olivine may be obtained from various sources in the world, e.g. in Norway, Greenland and North-America. Raw olivine mineral may be ground substantially to the suitable size with conventional methods, such as by milling in a cone crusher and/or disk mill, and the material may optionally be fractioned to obtain a more homogeneous size distribution.

As mentioned, the raw olivine may contain up to about 5-8% of other minerals, but preferably the raw olivine is at least about 90% pure for the process of the present invention, and more preferably about 95% pure.

The mineral acid solution to which the olivine is added may comprise one or more suitable mineral acid; presently preferred solutions comprise in the range of about 10-37 wt % hydrochloric acid, such as in the range of about 18-37% HCl, or the range of about 15-30% HCl such as in the range of about 15-25% HCl, and preferably in the range of about 20-30% HCl, such as in the range of about 20-25% HCl. It is contemplated that other mineral acids may be used in addition or alternatively, e.g. sulfuric acid or nitric acid, in which case a suitable concentration can be readily adjusted to achieve a similar result as with an acid solution comprising only hydrochloric acid.

The manner in which olivine is dissolved in mineral acid is a key factor in controlling the specific surface area of the produced silica. The inventor has tested and compared several embodiments for dissolving the olivine in mineral acid in a controlled manner. The phrase "dissolving in a controlled manner" means in this context to mix the acid and olivine and control and keep within suitable limits at least parameters including acid concentration, leaching temperature, and period of time for which the olivine is leached in the acid. Preferably the rate at which olivine is added to the acid solution is controlled. It may also be preferable to add simultaneously to a reactor acid and olivine. In one embodiment of the invention the concentration of acid is low (e.g., in the range of about 5-18% HCl, such as in the range of about 8-15% HCl) when the addition of olivine is started and where after the concentration of acid is increased in a controlled manner by the addition of a more concentrated acid (e.g. in the range of 30-37% HCl). Typically, the solution is vigorously agitated during the olivine addition and leaching, with suitable agitation means.

The temperature of the acid solution is preferably in the range of about 50-110° C., when the addition of olivine is started, such as in the range of about 60-110° C. or about 70-110° C., such as in the range of about 80-110° C. or in the range of about 80-100° C., including about 90° C. or about 100° C. The dissolution of olivine in acid is exothermic which will result in a temperature increase of the reaction mixture, unless very efficient cooling is employed. The rate of temperature increase is dependent on several factors, as for example the grain size of the olivine used, the concentration of the acid and the ratio of olivine to acid. When hydrochloric acid of about 20-22 wt % HCl concentration is used we have found that the temperature can increase to the boiling point of the acid, 109-110° C. (in reactors operated at ambient pressure). Reactors operating under pressure can also be used. The total reaction time is preferably in the range of about 10-600 minutes, including the range of 0.2-6 hours, such as about 0.2-4 hours or about 0.3-3 hours, and more preferably in the range of 0.3-2 hours. By dissolving the olivine in a controlled manner as described above and adjusting the parameters as described, silica may be obtained with a specific surface are measured according to the BET method in the range of about 50-500 m$^2$/g, such as in the range of about 100-400, including the range of about 150-400 m$^2$/g, such as the range of about 150-300 m$^2$/g, including the range of about 150-250 m$^2$/g and the range of about 150-200 m$^2$/g, as well as the range of about 100-200 m$^2$/g. In preferred embodiments the specific surface area is at least about 100 m$^2$/g, including at least about 120 m$^2$/g, and preferably at least about 150 m$^2$/g. It will be highly appreciated that the present method allows control of the obtained specific surface area of the produced silica, by proper adjustment of relevant parameters as explained herein, such that silica with different specific surface area can be obtained depending on the intended use of the silica.

After the olivine-silica slurry has been heated for the desired period of time, undissolved olivine and other contaminating minerals should be separated from the slurry. This may be readily accomplished by allowing the slurry to sediment (e.g., in the range of about 5-15 cm, however, this depends on the height of the reactor used) for a brief period of time, such as in the range of about 0.1 to 5 minutes, and preferably in the range of about 15-200 sec., such as the range of about 30-90 sec. The bulk of the slurry liquid can then be separated from the sediment, e.g. by suctioning or decanting. Longer sedimentation time will results in more loss of silica, since part of the silica will also sediment together with the mineral impurities. Alternatively, a hydrocyclone of suitable dimensions can be used for this purpose, or other conventional equipment suitable for separation of coarse particle material from finer particles. Most of the coarse grained mineral impurities, consisting of undissolved olivine and insoluble minerals, are separated in this way from the bulk of the silica. However, fine-grained mineral impurities are not separated effectively from the bulk of the silica in this way.

The silica slurry is filtered to separate from it dissolved metal salts and other impurities, with conventional filtering techniques and the silica filter cake is washed with aqueous washing liquid (typically water) until suitably pure. The resulting partially purified silica is subsequently slurried again to obtain a low viscosity slurry, yet with a high content of solid material, preferably in the range of about 10-30%, and preferably the range of about 10-25%, such as the range of about 15-25%, such as the range of about 12-25%, including the range of about 15-20%, or the range of about 12-20%, such as about 12% or about 15%. It will be highly appreciated that the present invention provides means to obtain such a low viscosity slurry with a high content of solid material. This is preferably achieved by adjusting the pH of the slurry to within the range of about pH 1-5, such as in the range of about pH 2-5 or 3-5; the inventor has surprisingly found that fine grained mineral impurities can be effectively separated form such concentrated low viscosity silica slurries, e.g. slurries with a viscosity lower than about 100 mPa·s at a shear rate of 20 s$^{-1}$, and more preferably lower than about 50 mPa·s at a shear rate of 20 s$^{-1}$. With the above method, slurries with a solid content in the range of about 18-25 wt % can be obtained with a viscosity in the range of about 5-30 mPa·s at a shear rate of 20 s$^{-1}$. Accordingly, the low viscosity slurry of the present invention preferably has a viscosity in the range of about 1-200 mPa·s at a shear rate of 20 s$^{-1}$, and more preferably in the range of about 1-100, such as in the range of about 5-50 mPa·s at a shear rate of 20 s$^{-1}$. Other means may be applied to obtain a low viscosity concentrated slurry, including adding sodium aluminate to the silica filter cake, preferably in a concentration range of about 300-10.000 ppm alumina in silica, such as in the range of about 500-7000 ppm, or the range of about 500-5000 ppm, at a pH in the range of 4-9, such as in the range of about 5-8, and preferably in the range of about 6-7. Mineral acid, for example sulfuric acid or hydrochloric acid, may be added for pH adjustment.

Different means can be used for the preparation of the low viscosity silica slurry from the silica filter cake and acid or from silica filter cake and sodium aluminate (where acid is optionally used for pH adjustment. These include dispersers of various types, such as ultrasonic dispersers, and high shear mixers. The preparation of the silica slurry can be carried out in several steps as for example by first mixing the silica filter cake and chemicals, and then subjecting the slurry to a dispersing step.

In the next step of the process, further mineral impurities are separated from the silica slurry, i.e., the slurry is degritted.

This is conveniently done by conventional degritting methods, for example by letting the slurry sediment one or more times and separating the slurry from the sediment, or by using hydrocyclones of suitable dimensions. The pH of the substantially purified degritted slurry may then optionally be adjusted to a desired pH value prior to drying. For example, if the pH of the silica slurry has been adjusted to a value between 1-5 to obtain a low viscosity slurry, the pH can subsequently be raised by adding a base to raise the pH of the slurry such that the dried silica will have a higher pH. In one embodiment the pH of the silica slurry is adjusted to within a range of about 5-9, such as the range of about 5-8.5, including the range of about 6-8.5, e.g. the range of about 6-8. If sodium hydroxide or ammonia is used to increase the pH of the silica slurry it will become very viscous and paste-like if the pH higher than about 5. Such viscous pastes can be dried in spin flash dryers (e.g., from NIRO, Denmark), swirl fluidizers (e.g., as supplied by APV Anhydro, Denmark) or similar equipment, to yield silica powders. Such dried powders may subsequently be granulated.

The silica slurry may be dried with other conventional drying means well known in the art, and pulverized after drying if necessary. As mentioned above, a high silica content of the slurry will substantially safe the time and/or energy required to dry the silica.

In a useful embodiment, the silica slurry is dried in a spray dryer to obtain silica beads, for example of 50-500 μm diameter. This can be done directly after degritting or after pH adjustment, provided the slurry is still sprayable after pH adjustment. A sprayable slurry can optionally be obtained by the use of sodium aluminate, as described above. Such beads can further be granulated by conventional means to obtain larger granules such as of about 1-10 mm, measured along their axis of longest dimension.

With the method comprising the above-described steps, silica in powder, microbead or granule form is obtained with a high degree of purity and a controlled specific surface area, such as within the above-mentioned ranges.

As mentioned above, in certain useful embodiments the olivine is added to the mineral acid solution at a pre-determined rate. This may accomplished by various means, e.g. by use of a system and apparatus wherein the olivine particles flow into the acid solution through a pipe with a diameter that limits the flux of olivine, or the olivine can be fed to the acid solution with any of various conveying means, e.g., a conveyor belt or a screw feeder. A suitable rate of the olivine addition will depend on many factors, such as the configuration and scale (volume and dimensions) of the container, agitation means used, etc. The olivine may also be fed to the reactor together with water or acid. In embodiments where the rate of olivine addition is controlled, the particle size of the divine has a substantially greater impact on the obtained specific surface area of the produced silica, than in embodiments where relative fast addition is applied. Consequently, where the rate of olivine addition is controlled as described herein, olivine having a particle size of less than about 0.40 mm is preferred and more preferably less than 0.30 mm, such as less than 0.20 mm. In certain embodiments, it may be beneficial to have a non-constant rate of addition, i.e. starting the addition at a first rate that is altered during the addition process one or more times. In one embodiment, olivine is added at a rate in the range of about 0.1-50 g olivine/equivalent acid/min, such as the range of about 0.2-20 g olivine/equivalent acid/min, including the range of about 1-10 g olivine/equivalent acid/min. The term equivalent in this context refers to the conventional ionic equivalent term, one equivalent of a substance participating in a neutralization reaction is that amount of a substance that either contributes or consumes 1 mol of hydrogen ions in that reaction.

EXAMPLES

Example 1

The chemical composition of the olivine used (AFS 120 from A/S Olivin, Norway) is shown in Table 1 and the results of sieve analysis in Table 2. This is a fraction of fines with a relatively high content of accessory minerals.

TABLE 1

Chemical composition of olivine sample

|  | Content (%) |
|---|---|
| MgO | 49.2 |
| $SiO_2$ | 42.1 |
| $Fe_2O_3$ | 7.3 |
| $Cr_2O_3$ | 0.49 |
| $Al_2O_3$ | 0.27 |
| NiO | 0.33 |
| MnO | 0.08 |
| CaO | 0.1 |
| L.O.I.* | 0.65 |
| $Na_2O$ | 0 |
| $K_2O$ | 0.01 |
| SUM | 100.53 |

*Loss on ignition

TABLE 2

Results of sieve analysis of olivine sample

| Mesh | mm | % on sieve | cumultative % |
|---|---|---|---|
| 60 | 0.25 | 0 | 100.0 |
| 80 | 0.18 | 0.2 | 99.8 |
| 120 | 0.125 | 30.4 | 69.4 |
| 170 | 0.09 | 40.5 | 28.9 |
| 230 | 0.063 | 19.5 | 9.4 |
| PAN | <0.063 | 9.4 | 0.0 |

For olivine dissolution a 2 L wide neck round bottom flask was used. The mixture was stirred with a paddle stirrer (70 mm swept diameter) made of PTFE (Teflon). The stirrer shaft (made of glass) was inclined and stirred at a speed of 530 rpm. The reactor was fitted with a water-cooled reflux condenser. The flask and its contents were heated on an oil bath kept at 95° C. The olivine dissolution was carried out as follows: The reactor was charged with 2024 g of 20 wt % hydrochloric acid and the acid heated to 70° C. Olivine (450 g) was poured into the acid through a funnel in about 20 seconds. Heating was continued after the addition of olivine to acid and the temperature recorded from the time of addition of olivine to acid. The solution was heated for about 2 h while stirring was continued. The temperature ranged from about 85° C. to about 109° C.

Stirring was stopped and the undissolved solid allowed to sediment for a short time, in the range of 30-90 sec. The slurry was then suctioned of the sediment. The slurry removed in this way still contains some undissolved minerals that are more difficult to remove from the silica. Apparently, the silica is flocculated or agglomerated and small-grained undissolved minerals seem to constitute a part of the silica flocks (agglomerates). That the silica is flocculated or agglomerated is beneficial for filtration since it seems to result in a fast filtration rate.

The slurry was then divided into two portions and each portion filtered hot (filtration time 20-25 minutes) and washed with cold (600 ml in 25-30 minutes) and then hot water (1600 ml in 30-35 minutes) under vacuum on 24 cm plastic Buchner funnels. The solid content of the filter cake was found to be 25 wt %.

The pH of the filter cake was determined by slurrying 10 g of filter cake in 25 ml of distilled water and measuring pH which was about 5 and the conductivity of this slurry was 6-8 µS/cm.

A part of the filter cake was then added to a small quantity of water, the pH adjusted to 2.9 and ultrasound was the used to disperse the silica, by immersing an ultrasonic horn into about 250 ml of slurry and treating for 1-2 min. More filter cake was the added to the slurry, the pH adjusted 2.9 and then and the slurry subjected to ultrasonic treatment. This process was repeated until a low viscosity slurry had been made of all the filter cake.

Degritting was carried out by allowing the slurry to sediment about 10 cm in 10-20 minutes. The slurry was then suctioned of the sediment and the sediment slurred again with some water, treated with ultrasound and allowed to sediment again and the slurry suctioned off. In this way a white degritted silica slurry with a solid content of 21.5 wt % was obtained. The color of the silica slurry changed during degritting, from grayish to white. The final sediment (with impurities) was gray. Some silica is lost with this sediment. The slurry was then spray-dried after degritting. The sample was analyzed and the results are listed in Table 3.

Example 2

This Example was carried out in the same manner as Example 1, except that 2065 g of 22% acid were used and 500 g olivine. The pH of the filter cake after washing was about 5 and it was slurred in water at pH 3 and degritted as previously. A slurry with 22 wt % solid content was obtained and this slurry was spray-dried. Analytical data for the sample are shown in Table 3.

Example 3

This Example was carried out in the same manner as Example 1, except that the quantity of olivine was about 2044 g and the heating time at 109° C. was a few minutes longer. The silica filter cake was also washed with a larger quantity of water so that the pH of the filter cake (determined as in Example 1) after filtration was 6.1. In order to get a low viscosity slurry from this filter cake it was necessary to add a larger quantity of water so the solid content of the slurry was only 8%, as compared to 21.5% in Example 1, and 22% in Example 2. This slurry was degritted as described in Example 1 and filtered and dried in an oven at 105° C. overnight. Results from analysis of the silica sample are shown in the Table 1.

TABLE 3

| Silica samples produced by batch process | | | |
|---|---|---|---|
| Sample: | Example 1 | Example 2 | Example 3 |
| Impurities* | | | |
| Na (%) | <0.002 | <0.002 | |
| Mg (%) | 0.112 | 0.124 | |
| Al (%) | 0.012 | 0.007 | |
| K (%) | <0.009 | <0.009 | |
| Ca (%) | 0.010 | 0.002 | |
| Cr (%) | 0.006 | 0.005 | |
| Mn (%) | 0.0010 | <0.0005 | |
| Cu (%) | <0.003 | <0.003 | |
| Fe (%) | 0.012 | 0.010 | |
| Ni (%) | <0.003 | <0.003 | |
| Humidity, 105° C. (%) | 0.0 | 0.0 | |
| L.O.I. at 1000° C. (%)* | 6.1 | 5.6 | |
| pH of 10% slurry in water | 3.3 | 3.3 | 6.0 |
| Specific surface area (m$^2$/g)** | 190.4 | 175.2 | 155.6 |
| Pore volume (cm$^3$/g)** | 0.55 | 0.50 | 0.59 |
| Micropore volume (cm$^3$/g)** | 0.018 | 0.013 | 0.012 |

*Impurities are quantified after drying at 105° C.
**Determined from nitrogen adsorption isotherms Examples 1 and 2 demonstrate that by degritting at about pH 3 it is possible to get a low viscosity high solid contents slurry that can be degritted and then spray dried directly with relatively little energy used. If however the slurry is degritted at about pH 6 the slurry has to be much more diluted, with a solid content of about 8% such that the slurry can be degritted, calling for an additional filtration step before drying. We have experienced that by increasing the pH of a slurry with a solid content of about 21-22 wt % from about pH 3 to about pH 6-7 with sodium hydroxide (or other bases) the viscosity increases very much so that a very viscous paste is obtained. This paste can be subjected to a drying process like spin flash drying. The pH of the slurry can optionally be increased to 6-7 with sodium aluminate, as described in U.S. Pat. No. 4,537,699, which should result in a lower viscosity slurry that may possibly be spray dried.

Example 4

The same olivine was used as in the previous experiments, see Table 1.1134 g of 10.4% hydrochloric acid was heated to 94° C. on an oil bath set at 100° C. 130 g of olivine were poured into the reactor in 10 about seconds. The temperature of the reaction mixture rose to 102° C. in 14 minutes, whereafter the temperature began to fall slowly. After 28 minutes 832 g of 34.6% room temperature hydrochloric acid were poured into the reactor. When the temperature had risen to 94.5° C. a further addition of 320 g of olivine was started (at time 41.5 min. from start). Olivine was added in 20 g portions every 3-5 minutes and several g of water were used to flush the feeding funnel. The temperature profile during this experiment is seen in FIG. 1. The time of olivine addition can most often be seen in this figure by the slight drop in temperature upon olivine and water addition. The temperature during this experiment was always under the boiling point, see FIG. 1. Addition of olivine was completed in minute 85 after initial addition of 130 g of olivine. The average rate of olivine addition corresponds to a rate of addition of 0.47 g olivine/equivalent acid/min. Heating was continued for an additional 110 minutes after addition of olivine was completed. The pH of a slurry sample cooled to room temperature was found to be −0.65. The resulting slurry was than filtered hot in two portions on 24 cm Bucher funnels, the filtration time only being about 5 minutes. Total time for washing with 500 g of cold water and 1600 ml of hot water was about 14 minutes. A degritted silica sample from the filter cake had a specific surface area of bout 165 m$^2$/g. The pH of the filter cake was found to be about 7 (determined in a slurry obtained by slurrying 10 g of filter cake in 25 ml of distilled water) and the solid content of the filter cake was found to be 24.8%.

From this filter cake it was possible to make a low viscosity slurry at pH of 3.1 with a solid content of 23.8%. This slurry had a viscosity of 18 mPa·s at shear rate of 20 s$^{-1}$ and was found to be suitable for degritting. The viscosity was determined with Stresstech Rheometer (Rheologica Instruments AB, Sweden) in cone in cup setup.

Example 5

The composition of the olivine used in this experiment is shown below:

TABLE 4

Chemical composition of olivine sample

| | Content (%) |
|---|---|
| MgO | 49.29 |
| SiO$_2$ | 40.94 |
| Fe$_2$O$_3$ | 8.59 |
| Cr$_2$O$_3$ | 0.15 |
| Al$_2$O$_3$ | 0.57 |
| NiO | n.a. |
| MnO | 0.10 |
| CaO | 0.15 |
| L.O.I. | 0.65 |
| Na$_2$O | 0.15 |
| TiO$_2$ | 0.032 |
| SUM | 100 |

The particle size of this olivine sample is lower than 100 μm.

This sample had been subjected to magnetic treatment resulting in a decreased content of other mineral than olivine, e.g. chromite.

A solution of 23.4 wt % hydrochloric acid was heated to 90° C. on an oil bath and a slurry consisting of 60% olivine and 40% water was added to the hydrochloric acid solution. About 150 g of olivine (and 100 g of water) were added to 500 g of the hot acid solution in about 93 minutes. This corresponds to a rate of addition of 0.50 g olivine/equivalent acid/min. The calculated acid concentration of the resulting slurry is 19.5%.

The temperature of the oil bath was set at 95° C. After the first 30-40 minutes of olivine addition the temperature had increased to about 100° C. and remained at that level until about 5 minutes after the olivine addition was completed where after it dropped and reached about 95° C. in about 15 minutes. Heating was continued for about 1 hour after olivine addition was completed.

A large part of the silica this experiment seemed to have formed larger agglomerates that settled rapidly and made the silica difficult to separate from the undissolved minerals. The silica filtered easily.

The specific surface area of the silica from the above two experiments was about 60 m$^2$/g. This can be compared to the specific surface area of silica obtained from the same olivine sample when the olivine was added to cold hydrochloric acid and heated. In that case the specific surface area of the silica was 274 m$^2$/g. This silica sample filtered very slowly. When the same olivine is added in a short time (10 seconds) to the equivalent quantity of 90° C. hot hydrochloric acid in 20 wt % solution (corresponding to a rate of addition of 275 g oline/equivalent acid/min) a gelatinous silica is obtained, with part of the silica forming a stiff gel on the inner surface of the reactor. This gel did not mix with the stirrable slurry that was in motion because of the intense agitation of the reactor. A sample of the silica from the slurry was filtered washed and dried. It was found to have a specific surface area of 420 m$^2$/g.

Example 6

In this experiment the conditions of Example 5 were repeated except that the olivine was added at a faster rate, or about 150 g in 55 minutes. This corresponds to a rate of addition of 0.85 g olivine/equivalent acid/min. The specific surface area of the silica from this experiment was 110 m$^2$/g.

Example 7

In this experiment the conditions of Example 5 were repeated except that the olivine was added at a faster rate, corresponding to a rate of addition of 2.5 g olivine/equivalent acid/min. The specific surface area of the silica from this experiment was 175 m$^2$/g.

Example 8

In this experiment olivine with a particle size of 100-500 μm was used, see composition below in Table 5.

TABLE 5

Chemical composition of olivine sample

| | Content (%) |
|---|---|
| MgO | 49.79 |
| SiO$_2$ | 40.92 |
| Fe$_2$O$_3$ | 8.45 |
| Cr$_2$O$_3$ | 0.11 |
| Al$_2$O$_3$ | 0.38 |
| NiO | n.a. |
| MnO | 0.10 |
| CaO | 0.11 |
| Na$_2$O | 0.11 |
| TiO$_2$ | 0.033 |
| SUM | 100 |

This sample had been subjected to magnetic treatment resulting in a decreased content of other mineral than olivine, e.g. chromite.

Hydrochloric acid (20 wt %, 740 g) was heated on a 95° C. hot oil bath to 85° C. 150 g of the olivine was then added to the acid in about 15 seconds, corresponding to a rate of addition of 150 g olivine/equivalent acid/min. The temperature of the mixture then rose to 104° C. in about 16 minutes. After additional 4 minutes the temperature starts to decrease. The total heating time was 2 hours after addition of olivine was completed. The silica obtained was filtered, washed, degritted and dried as described previously. The BET specific surface area of the obtained silica was found to be 150 m$^2$/g.

Example 9

This experiment was carried out in the same manner as in Example 7 except the time for addition of olivine was 9 minutes, corresponding to a rate of addition of 4.1 g olivine/equivalent acid/min. Total heating time after addition of olivine was 2 h and the silica obtained was found to have a specific surface area of 100 m$^2$/g.

Examples 4-9 show that by controlling the rate of addition of olivine to hot hydrochloric acid it is possible to control the specific surface area of the silica obtained. The faster the rate of addition the higher the specific surface area of the silica obtained. It is also evident from these examples that this effect is more pronounced for fine grained silica than for large grained silica and that by using only one olivine grade of fine grained silica it is possible produce silica powders with different properties.

Example 10

Figure 2:
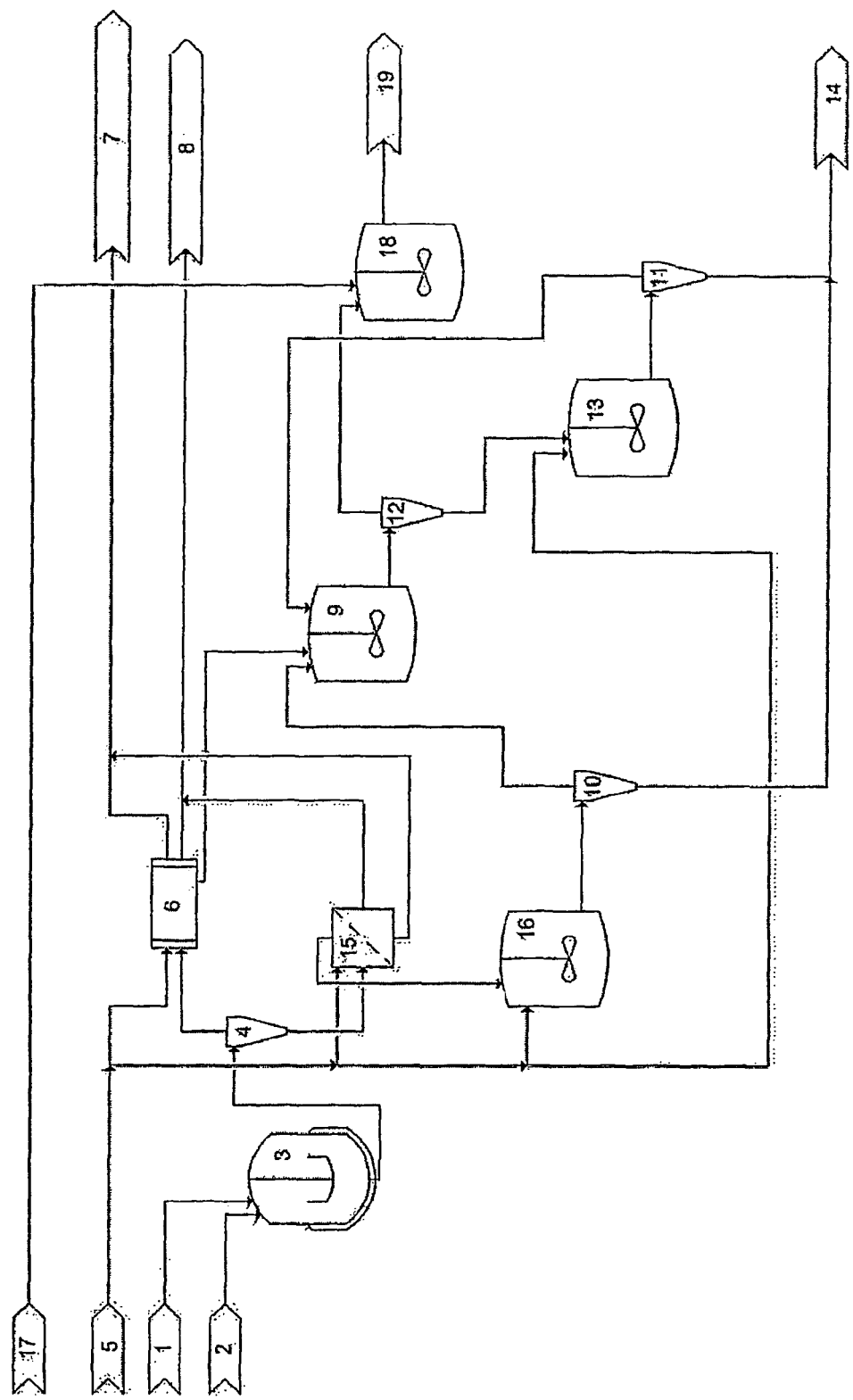
FIG. 2 illustrates schematically a commercial scale facility for carrying out an embodiment of the process of the invention, described in Example 10.

A system for industrial scale production of silica is shown schematically in FIG. 2.

Olivine (1) of suitable particle size as described herein, preferably less than 200 µm, and with low content of impurity minerals is added to a hydrochloric acid (2) in a stirred tank reactor (3) that has been heated to 70-90° C. The hydrochloric acid may optionally contain some dissolved metal chlorides resulting from dilute brine that has been recycled and used for HCl adsorption. The rate of addition of olivine is controlled. (Instead of a stirred tank reactor it would also be feasible to use a tubular continuous reactor, at least for about the first 30 minutes of heating). The mixture is heated for about 1-2 h and the reactor subsequently emptied.

Slurry of brine, silica and undissolved minerals from (3) is treated in hydrocyclone H1 (4) in order to separate most of the coarse undissolved minerals form the brine/silica slurry. Some of the finer undissolved minerals go with the silica brine/slurry in the overflow from hydrocyclone H1. The coarse undissolved minerals go to the underflow.

The brine/silica slurry (overflow from hydrocyclone H1) is filtered and washed with water (5) in a filter press (6) until the pH of the filter cake is about 4-6, depending on the purity desired. The filtrate, consisting of concentrated brine, and the solution recovered in the beginning of the washing process are combined and processed further (7). More dilute brine recovered later in the washing process is transferred (8) to a storage tank. Dilute recycled brine can optionally be used for the first part of the washing process. The filter cake is slurried in a dissolver (9), or similar equipment with overflow from hydrocyclones H2 (10) and H3 (11) and optionally some water and acid to obtain a low viscosity silica water slurry with a solid content of about 20%. The pH of the resulting slurry is about 3.5. Remaining fine undissolved minerals are separated from the silica slurry in a hydrocyclone H4 (12). The overflow from hydrocyclone H4 (12) (consisting of "degritted" silica slurry) is treated further as described below but the underflow is slurried with water (5) in a slurry tank (13) and the resulting slurry is pumped to a hydrocyclone H3 (11). The overflow from hydrocyclone H3 (11), consisting of dilute silica slurry is used to make slurry from filter cake in the dissolver (9). The underflow, consisting of undissolved minerals, silica and water may be treated further before waste disposal (14).

The undissolved minerals (and silica) in underflow from hydrocyclone H1 are filtered in a filter (15) and washed as described above for filtration and washing in the filter press (6). The filter cake is then slurred with water in a slurry tank (16) at pH ca. 3-4. The undissolved minerals are separated from the dilute silica slurry in hydrocyclone H2 (10). The silica slurry (overflow) from hydrocyclone H2 (10) is used together with overflow from hydrocyclone H3 (11) to make slurry from the filter cake, from the filter press, in the dissolver (9). The underflow from hydrocyclone H2 (10) goes to waste (14) together with the underflow from H3 (11).

(Alternatively, the overflow from hydrocyclones H2 (10) and H3 (11) can be treated separately to produce other silica grades if the properties of the silica in the overflow from the different hydrocyclones are different.)

The pH of the silica slurry (overflow) from hydrocyclone H4 (12) is adjusted to about pH 6.5 with NaOH (16) (about 1 kg/ton silica), in tank TC (17) (or static mixer) and the resulting thick paste (18) (about 20 wt % solids) is either dried directly in a suitable drier or allowed to age before drying.

The invention claimed is:

1. A process for producing silica from olivine, the silica in powder form with controlled specific surface area, the process comprising:
    (a) providing olivine particles of grain size less than or equal to about 1 mm;
    (b) mixing the olivine particles and a mineral acid solution in a leaching reaction at greater than or equal to about 50° C. and less than or equal to about 110° C., and reacting for greater than or equal to about 10 minutes and less than or equal to about 600 minutes in order to obtain silica with a controlled Brunauer, Emmett, and Teller ("BET") specific surface area greater than or equal to about 50 $m^2/g$ and less than or equal to about 500 $m^2/g$;
    (c) optionally separating at least part of undissolved olivine particles and other minerals from a resulting silica slurry;
    (d) filtering the resulting silica slurry to separate dissolved metal salts from the silica and washing a resulting silica filter cake;
    (e) slurrying the resulting silica filter cake in an aqueous solution at a pH greater than or equal to about 1 and less than or equal to about 5 and subjecting the slurried silica filter cake to dispersion in order to obtain a low viscosity slurry having a viscosity greater than or equal to about 1 mPa-sec and less than or equal to about 200 mPa-sec, with a solid content greater than or equal to about 10% and less than or equal to about 30%;
    (f) separating mineral impurities from the low viscosity silica slurry;
    (g) optionally adjusting a pH value of the low viscosity silica slurry; and
    (h) drying the low viscosity silica slurry.

2. The process of claim 1, wherein in step (e), sodium aluminate is added to the slurried silica filter cake to obtain the low viscosity slurry.

3. The process of claim 1, wherein in step (g), the pH value of the low viscosity silica slurry is adjusted to greater than or equal to about 5 and less than or equal to about 8.5.

4. The process of claim 1, wherein the olivine particles are dissolved in the mineral acid solution that is greater than or equal to about 70° C. and less than or equal to about 110° C.

5. The process of claim 1, wherein the olivine particles are added to the mineral acid solution at a predetermined rate.

6. The process of claim 5, wherein the olivine particles are slurried in an aqueous solution that is added to the mineral acid solution at a predetermined rate.

7. The process of claim 5, wherein the predetermined rate is greater than or equal to about 0.1 g olivine/equivalent acid/min and less than or equal to about 50 g olivine/equivalent acid/min.

8. The process of claim 5, wherein the olivine particles substantially have a grain size less than about 0.200 mm in diameter.

9. The process of claim 1, wherein the mineral acid solution comprises hydrochloric acid in an amount greater than or equal to about 10 wt % and less than or equal to about 37 wt %.

10. The process of claim 1, wherein the low viscosity silica slurry is dried in a spray dryer to obtain silica beads.

11. The process of claim 1, wherein the silica in the powder form is granulated.

12. The process of claim 10, wherein the silica beads are granulated.

13. The process of claim 1, wherein in step (e), the dispersion comprises using an ultrasonic disperser.

14. The process of claim 1, wherein in step (e), the dispersion comprises using a high shear mixer.

15. A process for producing silica from olivine, the silica in powder form with controlled specific surface area, the process comprising:
  (a) providing olivine particles of grain size less than or equal to about 1 mm;
  (b) mixing the olivine particles and a mineral acid solution in a leaching reaction at greater than or equal to about 50° C. and less than or equal to about 110° C., and reacting for greater than or equal to about 10 minutes and less than or equal to about 600 minutes in order to obtain silica with a controlled Brunauer, Emmett, and Teller ("BET") specific surface area greater than or equal to about 50 $m^2/g$ and less than or equal to about 500 $m^2/g$;
  (c) separating at least part of undissolved olivine particles and other minerals from a resulting silica slurry;
  (d) filtering the resulting silica slurry to separate dissolved metal salts from the silica and washing a resulting silica filter cake;
  (e) slurrying the resulting silica filter cake in an aqueous solution at a pH greater than or equal to about 1 and less than or equal to about 5 and subjecting the slurried silica filter cake to dispersion in order to obtain a low viscosity slurry having a viscosity greater than or equal to about 1 mPa-sec and less than or equal to about 200 mPa-sec, with a solid content greater than or equal to about 10% and less than or equal to about 30%;
  (f) separating mineral impurities from the low viscosity silica slurry; and
  (g) drying the low viscosity silica slurry.

16. The process of claim 15, further comprising:
  adjusting a pH value of the low viscosity silica slurry;
  wherein the pH value of the low viscosity silica slurry is adjusted after separating the mineral impurities from the low viscosity silica slurry and before drying the low viscosity silica slurry.

17. The process of claim 15, wherein the mineral acid solution comprises nitric acid, sulfuric acid, or nitric acid and sulfuric acid.

18. A process for producing silica from olivine, the silica in powder form with controlled specific surface area, the process comprising:
  (a) providing olivine particles of grain size less than or equal to about 1 mm;
  (b) mixing the olivine particles and a mineral acid solution in a leaching reaction at greater than or equal to about 50° C. and less than or equal to about 110° C., and reacting for greater than or equal to about 10 minutes and less than or equal to about 600 minutes in order to obtain silica with a controlled Brunauer, Emmett, and Teller ("BET") specific surface area greater than or equal to about 50 $m^2/g$ and less than or equal to about 500 $m^2/g$;
  (c) filtering the resulting silica slurry to separate dissolved metal salts from the silica and washing a resulting silica filter cake;
  (d) slurrying the resulting silica filter cake in an aqueous solution at a pH greater than or equal to about 1 and less than or equal to about 5 and subjecting the slurried silica filter cake to dispersion in order to obtain a low viscosity slurry having a viscosity greater than or equal to about 1 mPa-sec and less than or equal to about 200 mPa-sec, with a solid content greater than or equal to about 10% and less than or equal to about 30%;
  (e) separating mineral impurities from the low viscosity silica slurry;
  (f) adjusting a pH value of the low viscosity silica slurry; and
  (g) drying the low viscosity silica slurry.

19. The process of claim 18, wherein the mineral acid solution comprises nitric acid, sulfuric acid, or nitric acid and sulfuric acid.

20. A process for separation of silica of high purity from a mixture of undissolved minerals, metal salts, and silica with a controlled Brunauer, Emmett, and Teller ("BET") specific surface area greater than or equal to about 50 $m^2/g$ and less than or equal to about 500 $m^2/g$, the mixture being obtained by the dissolution of olivine in mineral acid, the process comprising:
  (a) filtering the mixture to form a filter cake, and washing the filter cake with water to remove dissolved salts, in order to form a washed filter cake;
  (b) preparing a low viscosity slurry with a viscosity less than or equal to about 200 mPa-sec, and with a solid content greater than or equal to about 10% and less than or equal to about 30%, from the washed filter cake by addition of an aqueous solution and by subjecting the slurry of the washed filter cake and aqueous solution to a dispersion step;
  (c) separating mineral impurities from the low viscosity slurry; and
  (d) drying the low viscosity slurry after separating the mineral impurities.

21. The process of claim 20, wherein in step (b), an acidic solution, or acid and water, is used to obtain the low viscosity slurry at a pH greater than or equal to about 1 and less than or equal to about 5.

22. The process of claim 20, wherein, in step (b),
  a solution of sodium aluminate is added to the washed filter cake in order to obtain the low viscosity slurry at a pH value greater than or equal to about 4 and less than or equal to about 9, and in step b an acid is added for pH adjustment.

23. The process of claim 20, wherein the slurry is dried in a spray dryer to obtain silica beads.

24. The process of claim 23, wherein the silica beads are granulated.

25. The process of claim 20, wherein the slurry is dried to obtain silica in powder form, which is further granulated.

26. The process of claim 20, wherein in step (b), the dispersion step comprises using an ultrasonic disperser.

27. The process of claim 20, wherein in step (b), the dispersion step comprises using a high shear mixer.

28. The process of claim 20, wherein at least part of the undissolved minerals are removed from the mixture prior to filtering in step (a).

29. The process of claim 20, wherein after separating the mineral impurities and before drying the low viscosity slurry, a pH value of the low viscosity slurry is adjusted to greater than or equal to about 5 and less than or equal to about 8.5.

30. The process of claim 20, wherein in step (a), a filtrate with the remove dissolved salts is recovered.

* * * * *